US009215401B2

(12) United States Patent
Liu et al.

(10) Patent No.: US 9,215,401 B2
(45) Date of Patent: Dec. 15, 2015

(54) DISPLAY DEVICE AND HOME NETWORK SYSTEM COMPRISING DISPLAY DEVICE

(71) Applicant: BOE TECHNOLOGY GROUP CO., LTD., Beijing (CN)

(72) Inventors: Haodi Liu, Beijing (CN); Qingjiang Wang, Beijing (CN); Zhiguo Zhang, Beijing (CN); Jing Liu, Beijing (CN); Yunlong Tian, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 130 days.

(21) Appl. No.: 14/067,598

(22) Filed: Oct. 30, 2013

(65) Prior Publication Data

US 2014/0118614 A1 May 1, 2014

(30) Foreign Application Priority Data

Oct. 31, 2012 (CN) .......................... 2012 1 0429891

(51) Int. Cl.
*H04N 7/01* (2006.01)
*H04N 3/14* (2006.01)
(Continued)

(52) U.S. Cl.
CPC ........... *H04N 7/0117* (2013.01); *G09G 3/3406* (2013.01); *G09G 3/3696* (2013.01);
(Continued)

(58) Field of Classification Search
CPC ... H04N 7/0117; H04N 3/127; G09G 3/3696; G09G 3/3688; G09G 3/3648; G09G 3/3406; G09G 3/3611; G09G 2320/0646; G09G 2320/064; G09G 5/006; G09G 2370/02; G09G 2370/14; G09G 2330/02; G09G 2340/0407
USPC .......... 348/441, 739, 744, 790, 791; 345/102, 345/204

IPC ............................... H04N 7/01,3/14, 5/64, 5/66
See application file for complete search history.

(56) References Cited

U.S. PATENT DOCUMENTS 6,809,716 B1 10/2004 Kim
2003/0043140 A1 3/2003 Ko et al.
(Continued)

FOREIGN PATENT DOCUMENTS

CN 101953155 1/2011
CN 102096232 6/2011
(Continued)

OTHER PUBLICATIONS

First Office Action issued in corresponding Chinese Application No. 201210429891.3 dated Sep. 2, 2014.
(Continued)

*Primary Examiner* — Sherrie Hsia
(74) *Attorney, Agent, or Firm* — Baker Hostetler LLP

(57) ABSTRACT

The present invention provides a display device, which comprises: a liquid crystal panel; a backlight unit configured to provide the liquid crystal panel with a light source; a digital interactive interface for video and audio configured to input/output all signals into/from the display device; a signal conversion module configured to convert the signal input via the digital interactive interface for video and audio into a first signal; a signal processing unit configured to adjust a resolution of the first signal converted by the signal conversion module to a predetermined resolution, convert the first signal whose resolution is adjusted to the predetermined resolution into a second signal for time-sequence control over the liquid crystal panel, and transmit the second signal to the liquid crystal panel; and a power source module configured to supply power to the liquid crystal panel, the backlight unit and the signal processing unit.

19 Claims, 3 Drawing Sheets

(51) Int. Cl.
　　　*G09G 5/00*　　　(2006.01)
　　　*G09G 3/34*　　　(2006.01)
　　　*G09G 3/36*　　　(2006.01)

(52) U.S. Cl.
　　　CPC ............. *G09G 5/006* (2013.01); *G09G 3/3611* (2013.01); *G09G 2330/02* (2013.01); *G09G 2340/0407* (2013.01); *G09G 2370/02* (2013.01); *G09G 2370/14* (2013.01)

(56) References Cited

U.S. PATENT DOCUMENTS

| | | | |
|---|---|---|---|
| 2007/0146303 A1* | 6/2007 | Kaminosono et al. | 345/102 |
| 2007/0159447 A1* | 7/2007 | Choi | 345/102 |
| 2009/0141197 A1* | 6/2009 | Kim | 348/790 |
| 2011/0013098 A1 | 1/2011 | Jung et al. | |
| 2011/0122169 A1 | 5/2011 | Choi et al. | |
| 2012/0226921 A1 | 9/2012 | Kim | |

FOREIGN PATENT DOCUMENTS

| | | |
|---|---|---|
| CN | 202121660 | 1/2012 |
| CN | 202142279 | 2/2012 |
| CN | 202150899 | 2/2012 |
| CN | 202395871 | 8/2012 |
| CN | 202395872 | 8/2012 |

OTHER PUBLICATIONS

Second Office Action issued in corresponding Chinese Application No. 201210429891.3 dated Mar. 2, 2015.

Extended European Search Report issued in corresponding European Application No. 13190711.5 dated Aug. 27, 2014.

* cited by examiner

DISPLAY DEVICE AND HOME NETWORK SYSTEM COMPRISING DISPLAY DEVICE

CROSS REFERENCE

The present application claims priority to the Chinese application No. 201210429891.3 filed on Oct. 31, 2012, the entire contents of which are incorporated herein by reference.

TECHNICAL FIELD

The present invention relates to the field of display technology, in particular to a display device and a home network system comprising the display device.

BACKGROUND

Smart TV is a novel TV product which has a fully-open platform, runs an operating system and can be expanded and upgraded continuously through installing and uninstalling application software by a user when he is watching normal TV programs. The smart TV can provide various application services such as network search, IPTV, BBTV, Video On Demand (VOD), digital music, network news, and Voice over Internet Protocol (VoIP). TV is becoming a third information access terminal after computer and mobile phone, and the user can access to the desired information at any time via the TV. Also, TV will become a smart device so as to achieve cross-platform search among the TV, the network and the program.

An existing smart TV is provided with a plurality of interfaces for inputting and outputting signals, such as a High-Definition Multimedia Interface (HDMI), a Digital Video Interface (DVI), as well as a power interface. As a result, during the operation, some troubles may be caused because the smart TV is required to provide the interfaces with several cables, and it is easy to cause erroneous connection between the cables and the interfaces.

SUMMARY

An object of the present invention is to provide a display device and a home network system, so as to solve the problems of connection troubles due to the existence of too many interfaces and cables for the display device as well as erroneous connection between the cables and interfaces in the prior art.

In one aspect, an embodiment of the present invention provides a display device, comprising:
 a liquid crystal panel;
 a backlight unit configured to provide the liquid crystal panel with a light source;
 a digital interactive interface for video and audio configured to input/output signals into/from the display device;
 a signal conversion module configured to convert the signal input via the digital interactive interface for video and audio into a first signal;
 a signal processing unit configured to adjust a resolution of the first signal converted by the signal conversion module to a predetermined resolution, convert the first signal having the predetermined resolution into a second signal for time-sequence control over the liquid crystal panel, and transmit the second signal to the liquid crystal panel; and
 a power source module configured to supply power to the liquid crystal panel, the backlight unit and the signal processing unit.

In another aspect, an embodiment of the present invention provides a home network system comprising the display device.

According to embodiments of the present invention, considering a problem that the power consumption of the display device is too high when the digital interactive interface for video and audio is integrated into the display device. Hence, the present invention provides the signal processing unit to adjust the resolution of the first signal to the predetermined resolution and convert the first signal whose resolution is adjusted to the predetermined resolution into the second signal for time-sequence control over the liquid crystal panel, so as to reduce the power consumption of the display device. In addition, the digital interactive interface for video and audio is successfully integrated into the display device, so as to replace the other interfaces of the display device and serve as a unique interface of the display device for inputting and outputting signals. As a result, it is able to simplify the connection between the cables and the interfaces, and to prevent the erroneous connection therebetween.

DETAILED DESCRIPTION

According to embodiments of the present invention, considering the problem that the power consumption of a display device is too high when a digital interactive interface for video and audio (DIIVA) is integrated into the display device. Hence, the present invention provides the following technical solution: a signal processing unit adjusts a resolution of a first signal to a predetermined resolution and converts the first signal whose resolution is adjusted to the predetermined resolution into a second signal for time-sequence control over a liquid crystal panel. By implementing the above technical solution, the power consumption of the display device. In addition, the DIIVA is successfully integrated into the display device, so as to replace the other interfaces of the display device and serve as a unique interface of the display device for inputting and outputting signals. As a result, it is able to simplify the connection between cables and the interfaces, and to prevent the erroneous connection therebetween.

The DIIVA includes thirteen pins, i.e., eight signal pins and five ground pins. The DIIVA includes the following main functions: transmitting data at a 17.82 G bandwidth (including a 13.5 G bandwidth for an uncompressed video channel and a 4.32 G bandwidth for a two-way data channel), transmitting data in an any-to-any mode, and supporting a 24 W (12V*2 A) power input.

The present invention is detailedly described hereinafter in conjunction with the drawings.

Figure 1:
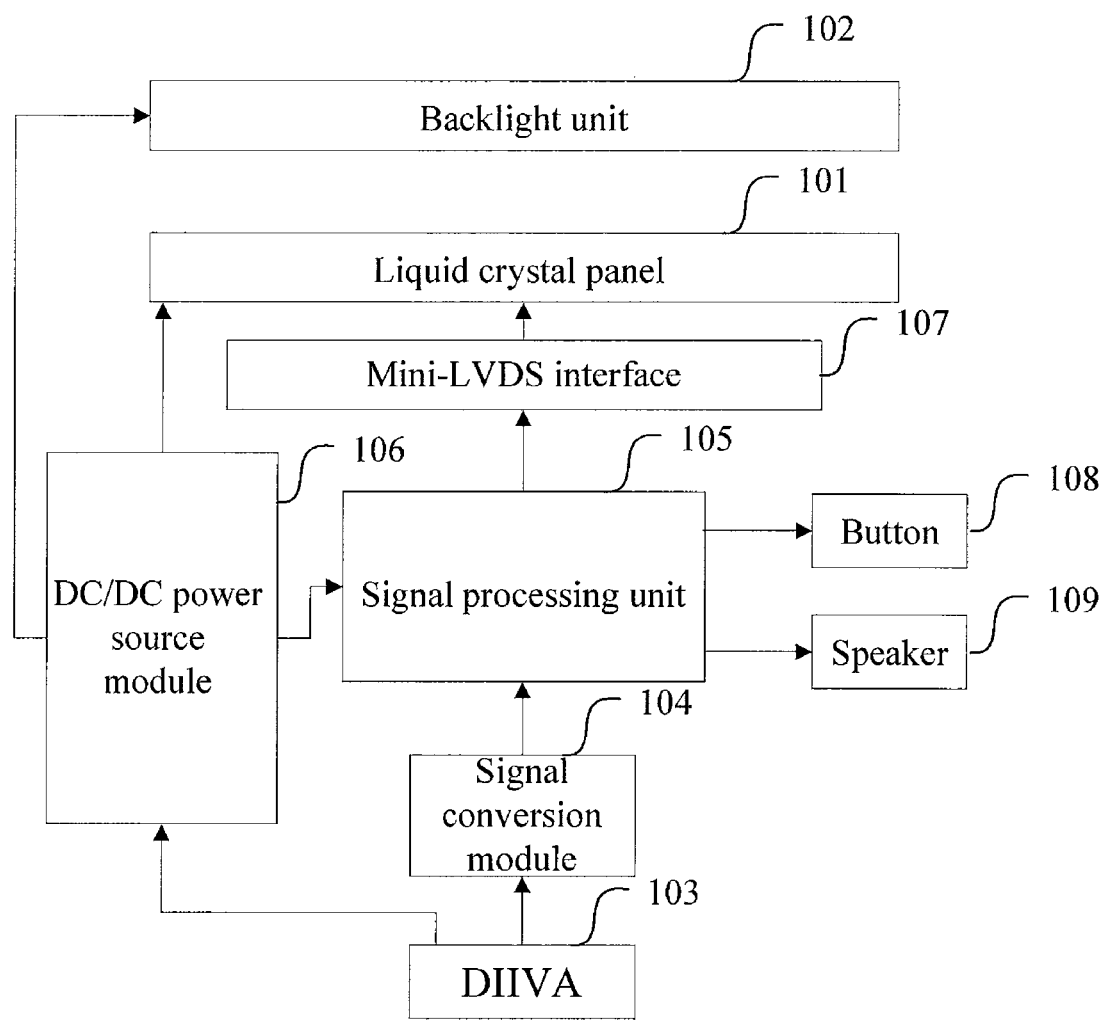
FIG. 1 is a schematic view showing the structure of a display device according to embodiments of the present invention.

As shown in FIG. 1, the present invention provides a display device, comprising:

a liquid crystal panel 101 and a backlight unit (BLU) 102 configured to provide the liquid crystal panel 101 with a light source;

a digital interactive interface for video and audio (DIIVA) 103 configured to input/output all signals into/from the display device;

a signal conversion module 104 configured to convert the signal input via the DIIVA 103 into a first signal;

a signal processing unit 105 configured to adjust a resolution of the first signal converted by the signal conversion module 104 to a predetermined resolution, convert the first signal having the predetermined resolution into a second signal for time-sequence control over the liquid crystal panel 101, and transmit the second signal to the liquid crystal panel 101; and a power source module 106 configured to supply power to the liquid crsytal panel 101, the BLU 102 and the signal processing unit 105 respectively.

A DIIVA signal input via the DIIVA 103 includes an image signal.

Preferably, the signal conversion module 104 is specifically configured to convert the DIIVA signal input via the DIIVA 103 into a transistor-transistor logic (TTL) signal.

Preferably, the signal processing unit 105 is further configured to set the predetermined resolution according to a resolution of a screen of the display device comprising the signal processing unit 105.

During the implementation, any method for setting the predetermined resolution according to the resolution of the screen of the display device comprising the signal processing unit 105 may be applicable to the present invention. For example, the predetermined resolution may be set as a standard resolution of the screen of the display device.

For example, if the screen of the display device is a 17-inch widescreen having a standard resolution of 1440*900, the predetermined resolution may be set as 1440*900.

Preferably, the signal processing unit 105 is specifically configured to convert the first signal whose resolution is adjusted to the predetermined resolution into a mini-low voltage differential signal (Mini-LVDS) for the time-sequence control over the liquid crystal panel 101.

The signal processing unit 105 is specifically configured to transmit the second signal to the liquid crystal panel 101 for the time-sequence control over the liquid crystal panel 101.

Preferably, the signal processing unit 105 is specifically configured to transmit the Mini-LVDS to the liquid crystal panel 101 via a Mini-LVDS interface 107.

In a preferred embodiment, the signal processing unit 105 may be a chip of a MST740KU-LF type.

Preferably, the BLU 102 is of a single long-side light-entering structure.

Figure 2:
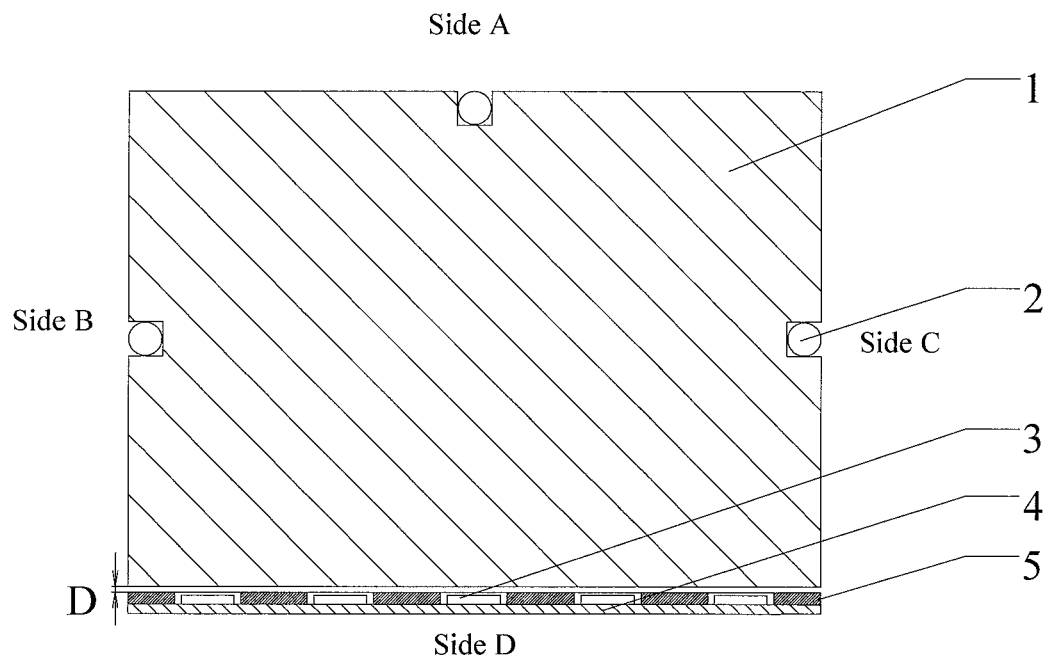
FIG. 2 is a schematic view showing the structure of a backlight unit according to embodiments of the present invention.

FIG. 2 shows the BLU 102 with the signal long-side light-entering structure. As shown in FIG. 2, sides A, B and C of a light guide plate 1 are provided with slots, and fixed onto a back plate through a locating pin 2. A LED (light-emitting diode) light bar 4 is located at a side D of the light guide plate 1.

Preferably, the BLU 102 includes a light bar cover 5 for covering all LED lamps 3 in the LED light bar 4. An upper surface of the light bar cover 5 is in direct contact with a light-entering surface of the light guide plate 1. A plurality of holes are provided in the light bar cover 5 so that the light generated by each LED lamp 3 in the LED light bar 4 can pass therethrough. The number of the holes is equivalent to the number of the LED lamps 3 in the LED light bar 4. Any hole through which the light generated by each LED lamp 3 in the LED light bar 4 can pass may be applicable, e.g., a hole with an upper pore size greater than a lower pore size (i.e., the pore size of the end close to the LED lamp 3) and with a circular, square (rectangular or quadrate), or trapezoidal cross section. With respect to the length of each LED lamp 3, the lower pore size of the hole is just large enough to accommodate the LED lamp 3.

Figure 3:
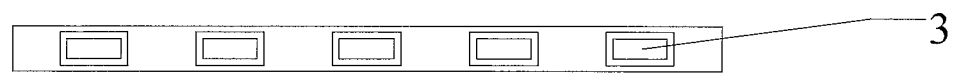
FIG. 3 is a sectional view showing the structure of a light bar according to embodiments of the present invention.

FIG. 3 is a sectional view of the light bar 4. As shown in FIG. 3, the pore size of the hole in the light bar cover 5 is slightly greater than the length of each LED lamp 3.

Preferably, the side D of the light guide plate 1 may be fixed by the light bar cover 5.

Because the upper surface of the light bar cover 5 directly contacts with the light-entering surface of the light guide plate 1, it is able to prevent the LED lamp 3 from being damaged due to the direct contact of the light guide plate 1 with the LED lamp 3.

Preferably, through the structure of the BLU 102 of the embodiment of the present invention, a travel distance D of the incident light is from 0 to 0.1 mm during the coupling of the light from the LED lamp 3 and the light guide plate 1. As a result, high luminous efficiency will be achieved.

The side D of the light guide plate 1 is fixed by the light bar cover 5 instead of the locating pin, so it is able to prevent the shadow of the locating pin.

Preferably, the power source module 106 may be a DC/DC power source module.

The power source module 106 may supply a 12V voltage and a 1 A current to the BLU 102, a 1.2V voltage and a 0.33 A current to the signal processing unit 105, and a 3.3V voltage and a 0.3 A current to the liquid crystal panel 101.

Preferably, the power source module 106 is connected to an external power source via the DIIVA 103.

The external power source may supply a 12V and 2 A power to the power source module 106.

Preferably, the input and output of signals and the input of power are performed via the DIIVA 103, and the power is supplied via a signal line. As a result, it is able to design the display device without any power cord.

Preferably, the display device may further comprise a button 108 and a speaker 109 which is configured to play the sound corresponding to image contents displayed by the display device.

The display for the display device may be achieved through the button 108, wherein the button 108 may be the touch button.

Preferably, the power consumption generated by the DIIVA 103, the signal processing unit 105, the signal conversion module 104, the Mini-LVDS interface 107, the button 108 and the speaker 109 is 11 W.

Due to the low power that can be supplied via the DIIVA 103 and the low power consumption generated by the display device of the present invention, the DIIVA 103 may be integrated into the display device. For example, the external power source supplies a 24 W (12V*2 A) power to the power source module 106 via the DIIVA 103, and the power source module 106 supplies a 12 W power to the BLU 102, a 1 W power to the liquid crystal panel 101 and a 11 W power to the DIIVA 103, the signal processing unit 105, the signal conversion module 104, the Mini-LVDS interface 107, the button 108 and the speaker 109, then the power consumption generated by the display device is 24 W. As a result, it is able to integrate the DIIVA into the display device of the present invention.

The above description is made by taking FIG. 1 as an example. In actual application, the circuit board of the display device as shown in FIG. 1 may also comprise the other modules, and the display device comprising the other modules may also be applicable to the present invention. For the display device comprising the other modules, the external power source supplies a 24 W power to the power source module 106 via the DIIVA 103, and the power source module 106 supplies a 12 W power to the BLU 102, a 1 W power to the liquid crystal panel 101, a 11 W power to all the modules other than the BLU 102 and the liquid crystal panel 101 on the circuit board, then the power consumption generated by the display device is 24 W. As a result, it is able to integrate the DIIVA into the display device of the present invention.

The above description is merely made by taking a 12V and 2 A power supplied by the external power source to the power source module 106 via the DIIVA 103 as an example. The other modes are similar to the mode mentioned above, and they will not be repeated herein.

Because the DIIVA 103 integrated into the display device may serve as a unique interface of the display device and replace other interfaces, e.g., a signal input interface and a power input interface. As a result, it is able to simplify the connection between the cables and the interfaces.

The display device into which the DIIVA is integrated may be any display device, such as a smart TV, a color TV, a computer monitor, and a display device for a tablet computer.

The present invention further provides a home network system comprising the above-mentioned display device.

Figure 4:
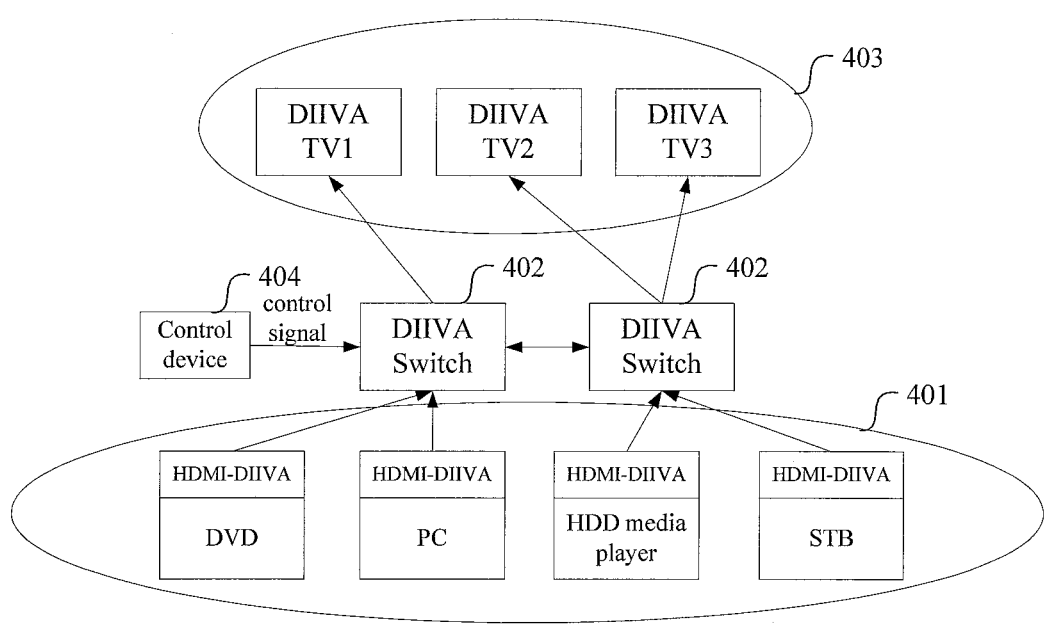
FIG. 4 is a schematic view showing the structure of a home network system according to embodiments of the present invention.

As shown in FIG. 4, the home network system comprises an input device 401, a DIIVA switch 402, a display terminal 403 and a control device 404. The display terminal 403 is the display device of the present invention.

The home network system which comprises at least one input device 401 and at least one display terminal 403 is described hereinafter. The other implementation modes are similar and will not be repeated herein.

The input device 401 may be any electronic device, such as a digital video disc (DVD), a personal computer (PC), a HDD media player, and a set top box (STB). The display terminal 403 may be a smart TV.

As shown in FIG. 4, interfaces of the input device 401 are changed to the DIIVA 103, the DIIVA signal from the input device 401 is transmitted to the DIIVA switch 402 via a DIIVA cable, and the control device 404 selects, by controlling the DIIVA switch, at least one display terminal 403, selects contents from the corresponding input device 401 to be displayed on the selected display device 403, and displays the selected contents on the displayed terminal 403.

The control device 404 may transmit a control signal to the DIIVA switch 402 via a network, so as to control the DIIVA switch 402. The DIIVA switch 402 may comprise a network module configured to receive the control signal from the control device 404 via the network.

The way that the control device 404 selects, by controlling the DIIVA switches 402, at least one display terminal 403 and selects the contents from the corresponding input device 401 to be displayed on the selected display device 403 includes controlling the DIIVA switches 402 to transmit the DIIVA signals received from one or more of all the input devices 401 to one or more display terminals 403.

The DIIVA switches 402 transmit the DIIVA signals received from one or more of all the input devices 401 to one or more display terminals 403 via the DIIVA cable. The DIIVA switches 402 as illustrated in FIG. 4 are connected with each other via the DIIVA cable.

The display terminal 403 is the display device of the present invention, and the DIIVA switch 402 may supply a 12V and 2 A power to the DIIVA 103 via the DIIVA cable, and then to the power source module 106 via the DIIVA 103.

The display device of the present invention may further comprise a network unit for providing network services. if the display terminal 403 is the display device comprising the network unit of the present invention, the network module of the DIIVA switch 402 is further configured to provide a network signal to the display device comprising the network unit of the present invention.

Although the preferred embodiments are described above, a person skilled in the art may make modifications and alterations to these embodiments in accordance with the basic concept of the present invention. So, the attached claims are intended to include the preferred embodiments and all of the modifications and alterations that fall within the scope of the present invention.

Obviously, a person skilled in the art may make improvements and modifications without departing from the spirit and scope of the present invention. If these improvements and modifications fall within the scope of the attached claims and the equivalents thereof, they are also intended to be included in the present invention.

What is claimed is:

1. A display device, comprising:
    a liquid crystal panel; and
    a backlight unit (BLU), configured to provide the liquid crystal panel with a light source;
    a digital interactive interface for video and audio (DIIVA), configured to input/output all signals into/from the display device;
    a signal conversion module, configured to convert the signal input via the digital interactive interface for video and audio into a first signal;
    a signal processing unit, configured to adjust a resolution of the first signal converted by the signal conversion module to a predetermined resolution, convert the first signal having the predetermined resolution into a second signal for time-sequence control over the liquid crystal panel, and transmit the second signal to the liquid crystal panel; and
    a power source module, configured to supply power to the liquid crystal panel, the backlight unit and the signal processing unit, respectively.

2. The display device according to claim 1, wherein the signal conversion module is specifically configured to convert a DIIVA signal input via the DIIVA into a transistor-transistor logic (TTL) signal.

3. The display device according to claim 1, wherein the signal processing unit is specifically configured to convert the first signal having the predetermined resolution into a mini-low voltage differential signal (Mini-LVDS) for the time-sequence control over the liquid crystal panel.

4. The display device according to claim 1, wherein the BLU is of a single long-side light-entering structure.

5. The display device according to claim 4, wherein the BLU comprises a LED light bar and a light bar cover, and
    wherein the light bar cover is configured to cover all LED lamps in the LED light bar.

6. The display device according to claim 5, wherein a plurality of holes are provided in the light bar cover so that the light generated by each LED lamp in the LED light bar can pass therethrough.

7. The display device according to claim 6, wherein an upper pore size of the holes is greater than a lower pore size of the hole.

8. The display device according to claim 6, wherein cross section shape of the hole is circular, rectangular, quadrate, or trapezoidal.

9. The display device according to claim 6, wherein a travel distance of incident light is from 0 to 0.1 mm during coupling of the light from each LED lamp and a light guide plate.

10. The home network system according to claim 9, wherein the BLU is of a single long-side light-entering structure.

11. The home network system according to claim 10, wherein the BLU comprises a LED light bar and a light bar cover, and
wherein the light bar cover is configured to cover all LED lamps in the LED light bar.

12. The home network system according to claim 11, wherein a plurality of holes are provided in the light bar cover so that the light generated by each LED lamp in the LED light bar can pass therethrough.

13. The home network system according to claim 12, wherein an upper pore size of the holes is greater than a lower pore size of the hole.

14. The home network system according to claim 12, wherein cross section shape of the hole is circular, rectangular, quadrate, or trapezoidal.

15. The home network system according to claim 12, wherein a travel distance of incident light is from 0 to 0.1 mm during coupling of the light from each LED lamp and a light guide plate.

16. The display device according to claim 1, wherein the power source module is a DC/DC power source module.

17. The display device according to claim 16 wherein the DC/DC power source module is connected to an external power source via the DIIVA.

18. The display device according to claim 1, wherein the display device is a smart TV.

19. A home network system, comprising the display device according to claim 1.

* * * * *